US007046389B2

(12) United States Patent
Lopez et al.

(10) Patent No.: US 7,046,389 B2
(45) Date of Patent: May 16, 2006

(54) VARIABLE DENSITY UNDER/OVERPRINTING MAPS FOR IMPROVING PRINT QUALITY

(75) Inventors: Matthew G Lopez, Escondido, CA (US); Jason R Arbeiter, Poway, CA (US); Michael S Gray, Encinitas, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 891 days.

(21) Appl. No.: 09/826,123

(22) Filed: Apr. 4, 2001

(65) Prior Publication Data

US 2002/0145743 A1 Oct. 10, 2002

(51) Int. Cl.
*G06F 15/00* (2006.01)

(52) U.S. Cl. .................... 358/1.18; 358/1.4; 358/1.14; 347/23; 347/40; 347/43

(58) Field of Classification Search ................ 358/1.8, 358/1.4, 1.14; 347/40, 43, 23
See application file for complete search history.

(56) References Cited

U.S. PATENT DOCUMENTS

| | | | | |
|---|---|---|---|---|
| 4,963,882 | A * | 10/1990 | Hickman | 347/41 |
| 4,999,646 | A * | 3/1991 | Trask | 347/41 |
| 5,706,414 | A | 1/1998 | Pritchard | 358/1.18 |
| 5,933,164 | A * | 8/1999 | Sato et al. | 347/43 |
| 5,975,677 | A * | 11/1999 | Marler et al. | 347/40 |
| 6,010,205 | A * | 1/2000 | Billet | 347/40 |
| 6,089,693 | A * | 7/2000 | Drake et al. | 347/19 |
| 6,132,021 | A | 10/2000 | Smith et al. | 347/6 |
| 6,234,606 | B1 * | 5/2001 | Suzuki | 347/43 |
| 6,238,047 | B1 * | 5/2001 | Suzuki et al. | 347/105 |
| 6,302,511 | B1 * | 10/2001 | Neese et al. | 347/19 |
| 6,733,100 | B1 * | 5/2004 | Fujita et al. | 347/12 |
| 2003/0142161 | A1 * | 7/2003 | Miura et al. | 347/19 |

* cited by examiner

*Primary Examiner*—Edward Coles
*Assistant Examiner*—Mark R. Milia

(57) ABSTRACT

A swath printing system and under/overprinting method compensate for the effects of defective printing elements by adjusting the under/overprinting map used during printing regions of a uniform color, typically black, to minimize the adverse impact on print quality of unprinted "white space" caused by the defective printing elements. A printing element quality detector determines which printing elements are functional and which are defective. Based on this information, a print controller then selects or constructs an under/overprinting map having under/overprinting pixel positions chosen to reduce these adverse effects on print quality caused by the defective printing elements, thus maintaining high image quality for the printed output.

27 Claims, 10 Drawing Sheets

VARIABLE DENSITY UNDER/OVERPRINTING MAPS FOR IMPROVING PRINT QUALITY

FIELD OF THE INVENTION

The present invention relates generally to a method for improving the quality of printing processes involving under/overprinting, and pertains more particularly to a method for adaptively specifying under/overprinting dot maps based on the quality of individual printing elements in a swath printer.

BACKGROUND OF THE INVENTION

In order to print an image such as a text document, a graphic or a photograph, on a print medium such as paper or transparency material, a typical high quality color inkjet printer prints a band, or "swath", at a time of colored ink drops which correspond to the data pixels that comprise the image. Typically, four different color inks (cyan, magenta, yellow, and black) are used by the printer to print the range of colors contained in the image. By printing successive swaths, the document or image is completely formed on the print medium. Such inkjet printers are described by W. J. Lloyd and H. T. Taub in "Ink Jet Devices," Chapter 13 of *Output Hardcopy Devices* (Ed. R. C. Durbeck and S. Sherr, San Diego: Academic Press, 1988). The basics of this technology are further disclosed in various articles in several editions of the *Hewlett-Packard Journal* [Vol. 36, No.5 (May 1985), Vol. 39, No. 4 (August 1988), Vol. 39, No. 5 (October 1988), Vol. 43, No. 4 (August 1992), Vol. 43, No. 6 (December 1992) and Vol. 45, No. 1 (February 1994)], incorporated herein by reference.

When a swath contains one or more relatively large regions which are to be printed in black, such as the interior portions of textual characters, it is important to achieve a uniform, high optical density, or darkness, in the black regions. One technique that is commonly used to produce black regions with uniform high optical density is under/overprinting. See, e.g., U.S. Pat. No. 6,132,021 to Smith et al., assigned to the assignee of the present invention and incorporated herein by reference in its entirety. In addition to printing these regions with black color ink (known as "process black" or "true black"), these regions may also receive drops of cyan, magenta, or yellow inks which are deposited underneath (underprinting) or on top of (overprinting) the drops of black ink. Particularly when the types of ink are different (for example, the black ink is typically pigmented, while the cyan, magenta, and yellow inks are generally dye-based), the under/overprinting results in improved optical density because the underprinted inks tend to pre-treat the surface of the print medium, and because the cyan, magenta, and (if used) yellow ink drops combine on the print medium to produce a "composite black" coloration. The amount of under/overprinting must be carefully controlled, however, in conjunction with the level of pixel depletion so as to avoid oversaturating the print medium with too much ink that will not dry quickly enough to avoid blotting onto the preceding or following page in the output tray of the printer, or smearing when handled by the user.

Unfortunately, the printhead containing the individual printing elements which controllably deposit the black ink drops on the print medium may degrade during the course of its useful life, resulting either in misdirected ink drops which are not deposited in the intended location, or no ink drops at all. Each such defective printing element in the printhead will typically produce a row or line of unprinted space on the print medium. Even if typical amounts of cyan, magenta, and yellow inks are deposited in these unprinted spaces via under/overprinting, the absence of true black ink will create areas of diminished optical density. Accordingly, it would be highly desirable to have a way to mitigate the adverse impact on the uniformity and optical density of black printed regions due to defective printing elements in the black printhead of the printer.

SUMMARY OF THE INVENTION

In a preferred embodiment, the present invention provides a new and improved printing system that adaptively underprints or overprints pixels based on the health of the printing elements so as to achieve a high level of image quality in the printed output despite the presence in the printing system of the defective printing elements. The invention is scalable such that it can be cost-effectively embodied in both high-end and low-end printing systems to mitigate the adverse effects of the defective printing elements. A print controller receives image data representing a region of uniform color, and generates control commands to a print mechanism for printing drops of a corresponding colored ink. In addition, the print controller also generates control commands to the print mechanism for printing drops of at least one additional fluid, as governed by an under/overprinting map for that fluid which specifies the pixel row and column locations for which drops of the fluid will be deposited. Each under/overprinting map defines a relatively higher percentage of printable pixel locations in the pixel rows corresponding to defective printing elements, and a relatively lower percentage of printable pixel locations in the pixel rows corresponding to functional ones of the printing elements. The defective and function printing elements are identified by a printing element quality detector connected to the print mechanism and the print controller for identifying the defective ones of the printing elements and the functional ones of the printing elements.

The present invention may also be implemented as a method for printing pixel rows of a predetermined region of an image swath in a uniform color. A first printhead for depositing a colored ink, and at least one additional printhead for depositing a fluid, are provided. Each printhead has individual printing elements for controllably printing individual pixels in corresponding ones of the pixel rows. Defective and functional printing elements of the first printhead are detected, and the rows corresponding to those defective printing elements and the functional printing elements are identified. Individual pixels of the region are printed with fluid from at least one of the additional printheads, with a higher percentage of pixels in the pixel rows corresponding to the defective elements being printed, compared to the percentage of pixels printed in the pixel rows corresponding to the functional elements. This printing of the predetermined region with fluid from additional printheads is done before or after pixels in the region are printed with the first printhead. The fluid may be a differently-colored ink, or a substantially clear conditioning solution. If two or more additional printhead deposit ink, the ink for each printhead typically is a different color. In the preferred embodiment, the first printhead prints black ink, while additional printheads deposit cyan and magenta inks, and in some embodiments yellow ink. A file of image data may be provided and processed to form the image swath.

An alternative method for printing a predetermined region of an image swath organized in rows and columns of pixels in a desired color identifies defective printing elements in a first printhead, and then provides at least one under/overprinting map for use with at least one additional printhead. Each under/overprinting map defines a predetermined total percentage of under/overprinted pixels, with relatively more of these pixels in at least some rows which correspond to the defective printing elements, and with relatively fewer of these pixels in at least some other rows which corresponding to other printing elements. Before and/or after printing the predetermined region with the desired color ink from the first printhead, the method prints the predetermined region with fluid from at least one of the additional printheads according to an appropriate one of the under/overprinting maps. In some embodiments, the predetermined total percentage is the same regardless of the number of defective printing elements in the first printhead; while in other embodiments, the predetermined total percentage is proportional to the number of defective printing elements in the first printhead. The predetermined region of the image swath typically represents at least a portion of at least one text character. In a preferred embodiment, the desired color ink is pigment-based, while the fluid is a dye-based ink of another color different from the desired color. Where the method includes the use of multiple under/overprinting maps, the predefined total percentage of under/overprinted pixels may be different for at least some of the overprinting maps. In some embodiments, providing a map further comprises constructing it based on the defective printing elements. In other embodiments, providing a map further comprises selecting one of a predefined set of maps based on the defective printing elements. Where an under/overprinting map has a width less than or equal to the number of columns in the swath and a height less than or equal to the number of rows in the swath, the printing further comprises replicating the under/overprinting map in the column direction and the row direction so as to encompass the total number of rows and columns in the swath.

BRIEF DESCRIPTION OF THE DRAWINGS

The above-mentioned features of the present invention and the manner of attaining them, and the invention itself, will be best understood by reference to the following detailed description of the preferred embodiment of the invention, taken in conjunction with the accompanying drawings, wherein.

DESCRIPTION OF THE PREFERRED EMBODIMENT

Figure 1A:
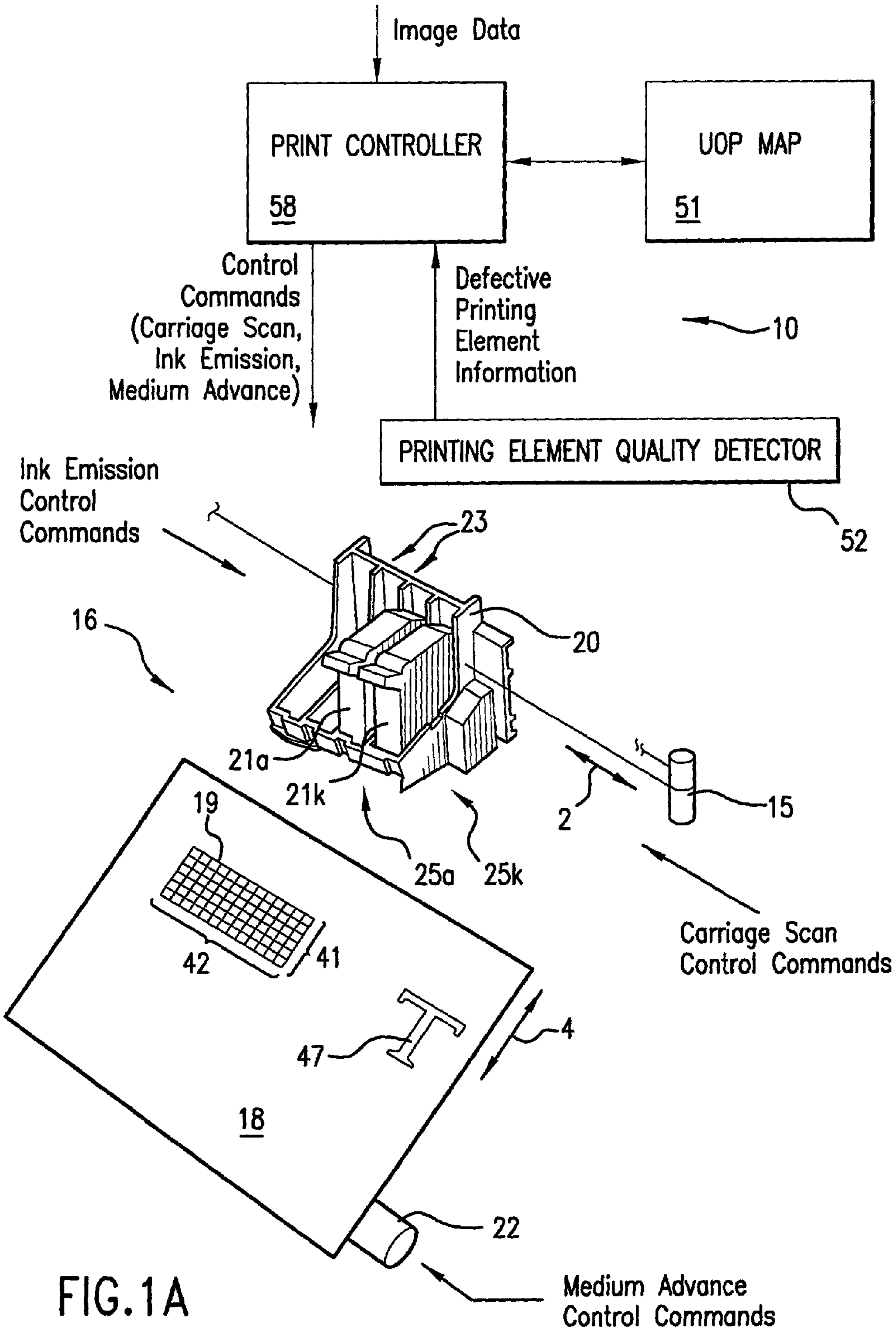
FIG. 1A is a schematic representation of a swath printing system embodying the present invention.

Referring now to the drawings, there is illustrated a swath printing system constructed in accordance with the present invention which, in conjunction with a novel method for printing regions of a certain color, increases optical density and provides uniform color even where defective printing elements exist in the printing system. As best understood with reference to FIGS. 1A & 1B, a preferred embodiment of the swath printing system 10 has a print mechanism 16 for controllable printing drops of a colored ink and at least one additional fluid from a plurality of individual printing elements onto specific pixel locations 19 in pixel rows 41 on a print medium 18, such as paper, transparency film, or textiles, in order to print swaths that form the image. These individual printing elements, such as printing elements 24, are disposed in printheads 25. Each printhead 25 is preferably mounted in a print cartridge 21 and fluidically coupled to a supply of the ink or other fluid to be printed (FIG. 1A illustrates generally a color printhead 25*k* in a color print cartridge 21*k*, and an additional printhead 25*a* in an additional print cartridge 21*a*). A print controller 58 is connected to the print mechanism 16 for generating and transmitting the control commands thereto. The print controller 58 is adapted to receive image data and, for data regions, such as data region 47, representing a particular uniform color, to generating the appropriate control commands to cause drops of the color ink and the additional fluid(s) to be deposited at the appropriate locations on the print medium 18 to form the desired printed image. The printing of the drops of each additional fluid is governed by an under/overprinting map 51 (also referred to as a “UOP map”) accessible by the print controller 58 (FIG. 1A illustrates by way of example a single UOP map 51 for governing under/overprinting from the additional print cartridge 21*a*). Each UOP map 51 specifies the individual pixel locations 19 in each pixel row 41 in which the drops of the corresponding additional fluid will be printed. The map 51 enables printing of the fluid at a predetermined percentage of pixel locations in the map 51. The predetermined percentage is chosen to be high enough to achieve high optical density and uniformity, but not so high as to cause blotting onto the preceding or following page in the output tray of the printing system 10, or smearing when handled by the user. As will be discussed subsequently in greater detail, the UOP map 51 is preferably a variable density UOP map which defines a relatively higher percentage of pixel locations 19 to be printed in the pixel rows 41 corresponding to defective printing elements 24, and a relatively lower percentage of printable pixel locations 19 in the pixel rows 41 corresponding to functional printing elements. When the UOP map 51 of the present invention is used in a system 10 with a color printhead cartridge 21*k* having one or more defective ones of the printing elements 24, the above-described arrangement of printable pixel locations advantageously compensates for the defective printing elements of the color printhead 25 and allows the region to be printed in a uniform high density color despite the defective printing elements in the color printhead 25*k*. In the preferred embodiment, as will also be described subsequently in further detail, the UOP map 51 is selected by the print controller 58 from a set of predefined alternate UOP maps.

In order to identify the defective printing elements and the functional printing elements, the swath printing system 10 has the capability to test each of the printing elements 24 of each printhead cartridge 21 to determine whether or not they are operating properly. For this purpose, the system 10 may include a printing element quality detector 52 for automatically determining defective printing elements 24 and identifying them to the print controller 58, which uses this information to assign the printing positions in each UOP map 51 as described above. The detector 52 is preferably a sensor, such as an optical or electrostatic in-flight sensor for detecting ink drops from a printing element during flight, an impact sensor which detects ink drops upon impact with the sensor, or an optical reflective sensor which detects printed patterns produced by the printing elements on the medium 18. Alternatively, the system 10 may produce a printed test pattern and have the user examine it to ascertain defective printing elements and input them into to the printing system 10. Additional details on the construction and operation of these sensors, and on methods for the detection and identification of defective and functional printing elements, may be found in the co-pending U.S. application Ser. No. 09/399,430, by Bland et al., heretofore incorporated by reference in its entirety.

Figure 1B:
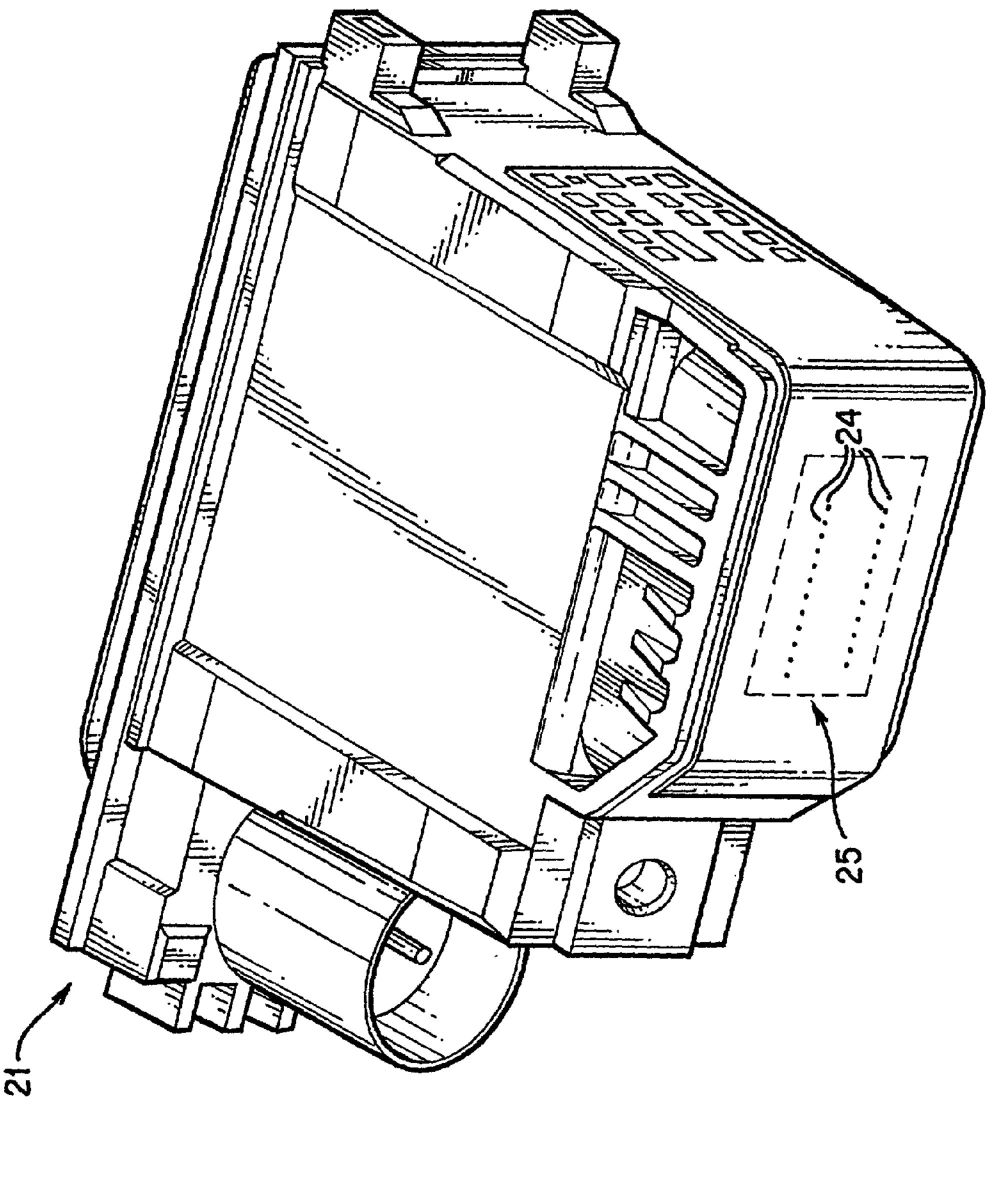
FIG. 1B is a schematic representation of an exemplary print cartridge usable in the swath printing system of FIG. 1A.
Figure 2:
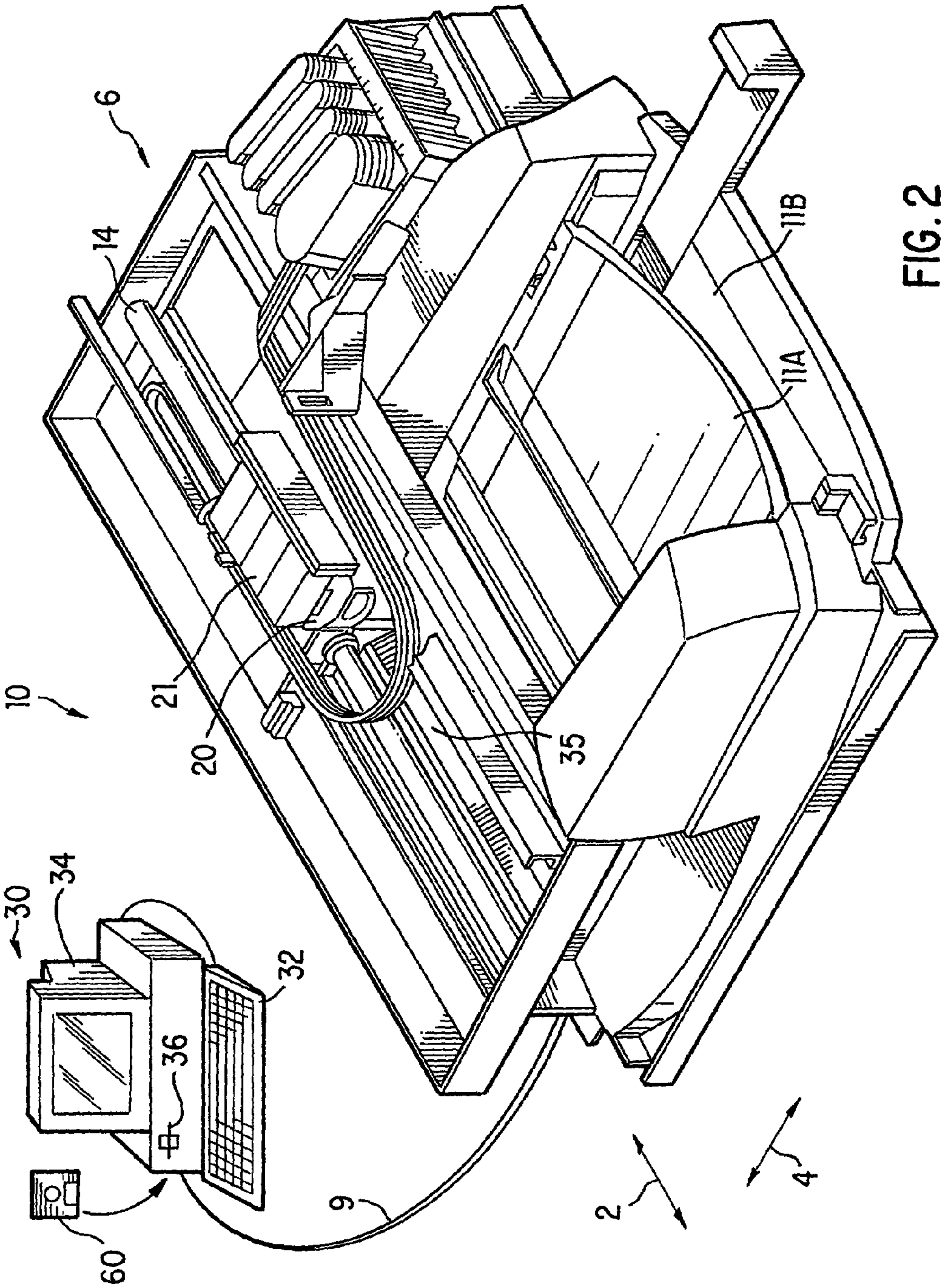
FIG. 2 is a schematic representation of the swath printing system of FIG. 1 incorporating a computer and a swath printer.

Considering the printing system 10 in further detail, and with reference to FIGS. 1A, 1B, and 2, a preferred embodiment of the printing system 10 includes a swath printer 6 coupled to a computer 30 via a communications interface 9. As well known to those skilled in the art, a preferred embodiment of the computer 30 includes a processor (not shown), memory (not shown), user-interface devices such as a display 34 and a keyboard 32 by which a user can interact with the printing system 10, and a mass storage interface 36 capable of receiving a program storage medium 60 containing segments of a program of instructions accessible and executable by the processor. A preferred embodiment of the swath printer 6 includes a slider rod 14 on which a carriage 20 is moveably mounted. The carriage 20 has stalls 23 for holding the printhead cartridges 21 and transporting the cartridges 21 in a printing orientation adjacent the surface of a print medium 18 having a plurality of pixel locations 19 organized in a rectangular array of rows 41 and columns 42. The carriage 20 is mounted in the printer 6 for relative motion with respect to the print medium 18 during a printing pass. The printing elements 24 of each printhead 25, while they may be physically arranged in multiple columns, are logically arranged as a linear array of nozzles substantially orthogonal to a scan axis 2, such that each printing element 24 is capable of depositing the drops of the ink or fluid onto a corresponding one of the rows 41 of pixel locations during individual printing passes. The carriage 20 is moveable along the scan axis 2 by a carriage advance mechanism 15. The printer 10 also has a print medium advance mechanism 22 which advances the print medium 18 along a medium advance axis 4 so as to change the row 41 of pixel locations on which an individual printing element prints. The print medium advance mechanism 22 draws the print medium 18 into the printer 6 from an input tray 11*b*, and delivers the medium 18 after printing to an output tray 11*a*. The carriage advance mechanism 15 and the print medium advance mechanism 22 are well known to those skilled in the art, and will not be discussed further hereinafter. By combining the relative movement of the carriage 20 along the scan axis 2 with the relative movement of the print medium 18 along the medium advance axis 4, each printhead cartridge 21 can deposit one or more drops of ink at each individual one of the pixel locations 19 in the rows 41 and columns 42 on the print medium 18.

In operation, the computer 30 typically acquires (eg. a photograph from a digital camera) or generates (eg. textual data or a graphic) a file of image data to be printed. During the printing process, the computer 30 transmits the image data to the printer 6 to produce the printed image. Wile all the image data can be transmitted in a single step, more typically only a portion of data, such as a data swath, is transmitted and processed by the printer 6 at a time.

Figure 3:
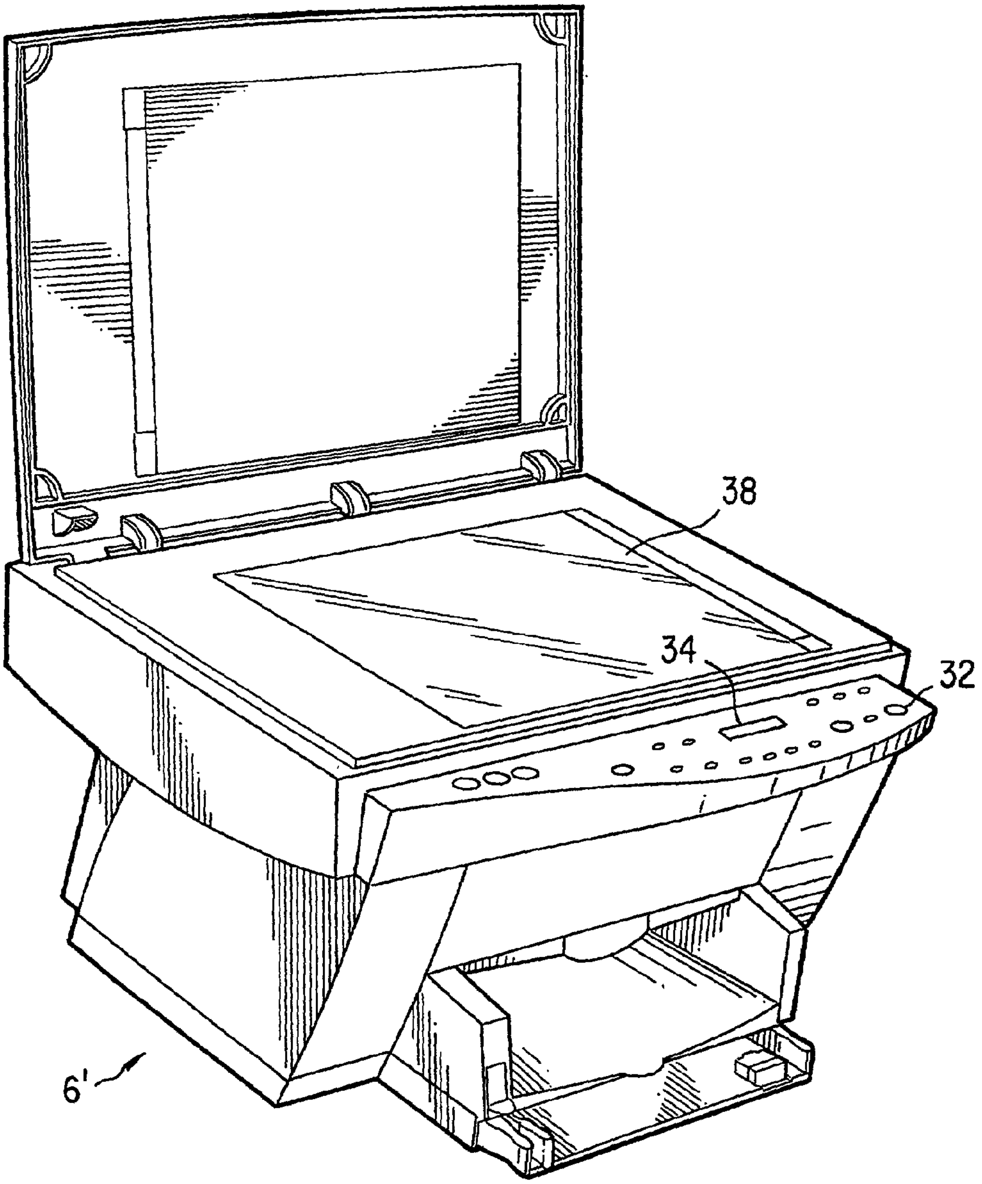
FIG. 3 is a schematic representation of the swath printing system of FIG. 1 incorporating a multifunction scanning and printing device.
Figure 4A:
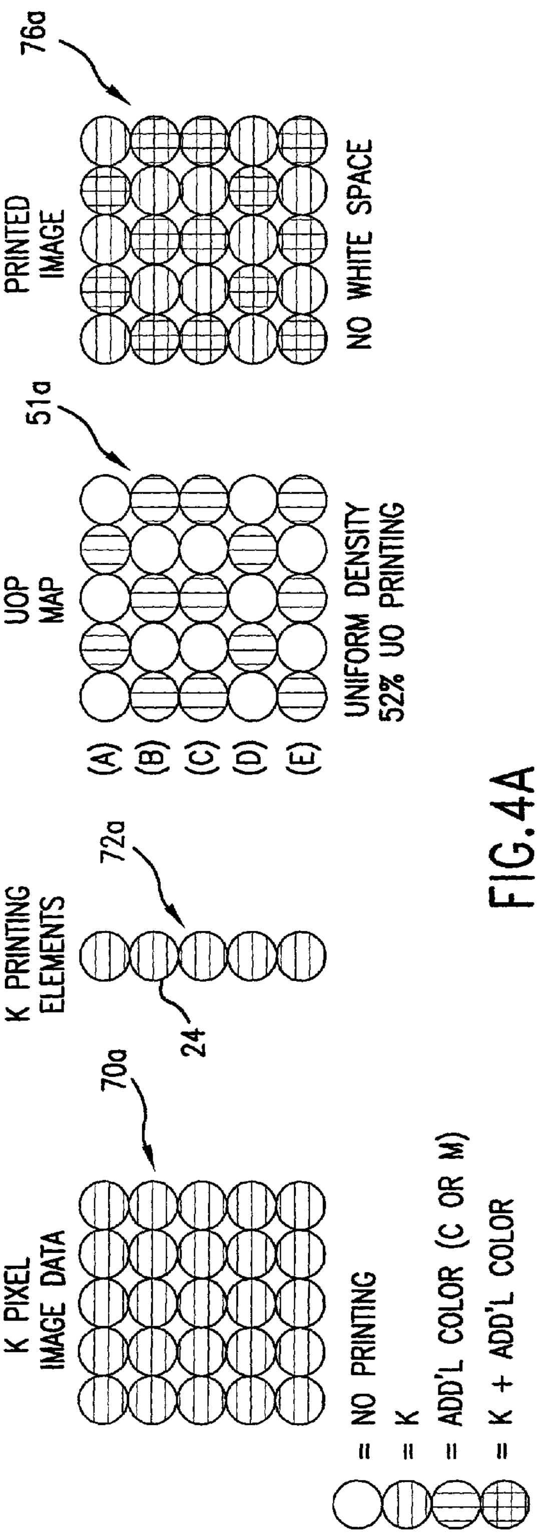
FIG. 4A is a schematic representation illustrating the printed image resulting from under/overprinting an exemplary black region using an exemplary uniform density 52% under/overprinting map applied to an exemplary set of functional printing elements.
Figure 4B:
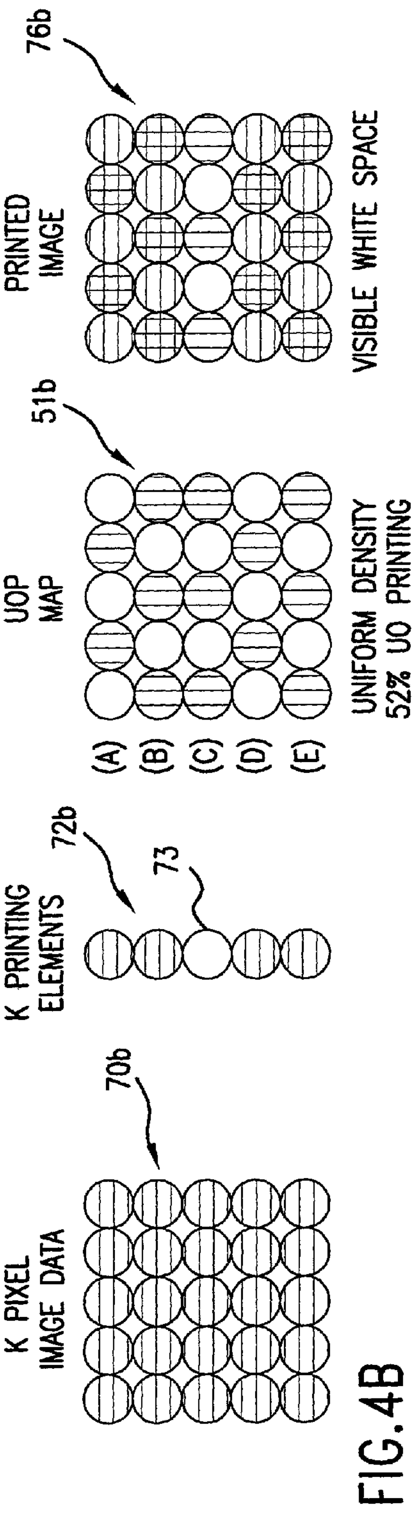
FIG. 4B is a schematic representation illustrating the printed image resulting from under/overprinting an exemplary black region using an exemplary uniform density 52% under/overprinting map applied to an exemplary set of printing elements, one of which is defective.
Figure 4C:
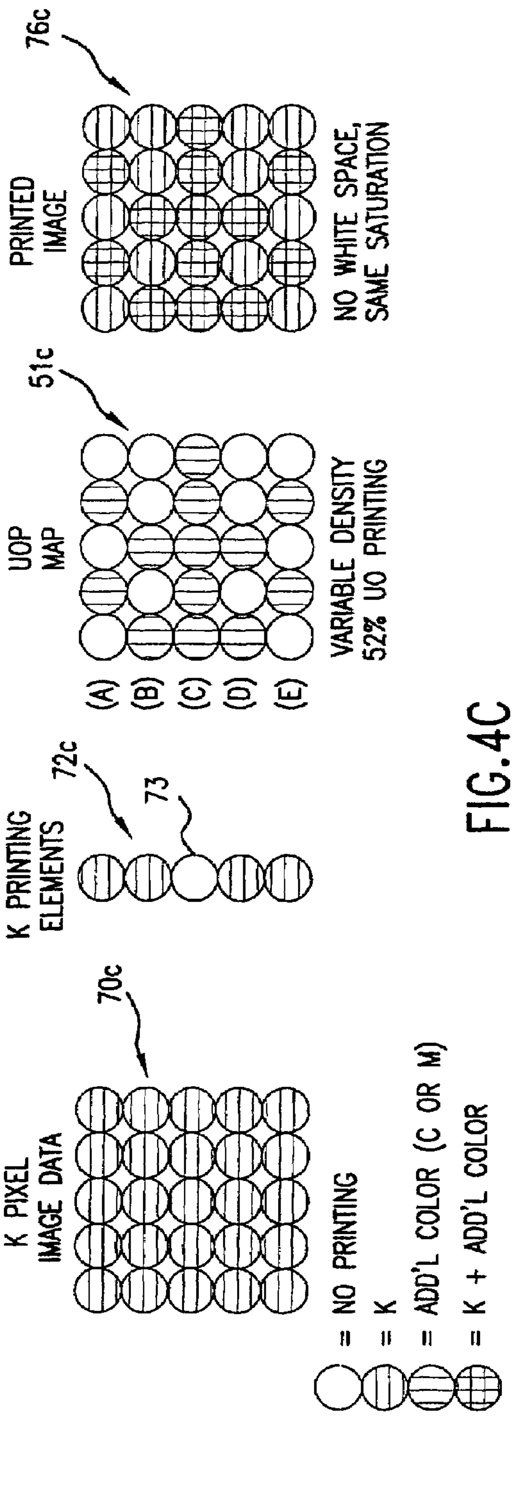
FIG. 4C is a schematic representation illustrating the printed image resulting from under/overprinting an exemplary black region using an exemplary adaptive variable density 52% under/overprinting map applied to an exemplary set of printing elements, one of which is defective, in which the selected mask is chosen to compensate for the defective printing element.
Figure 4D:
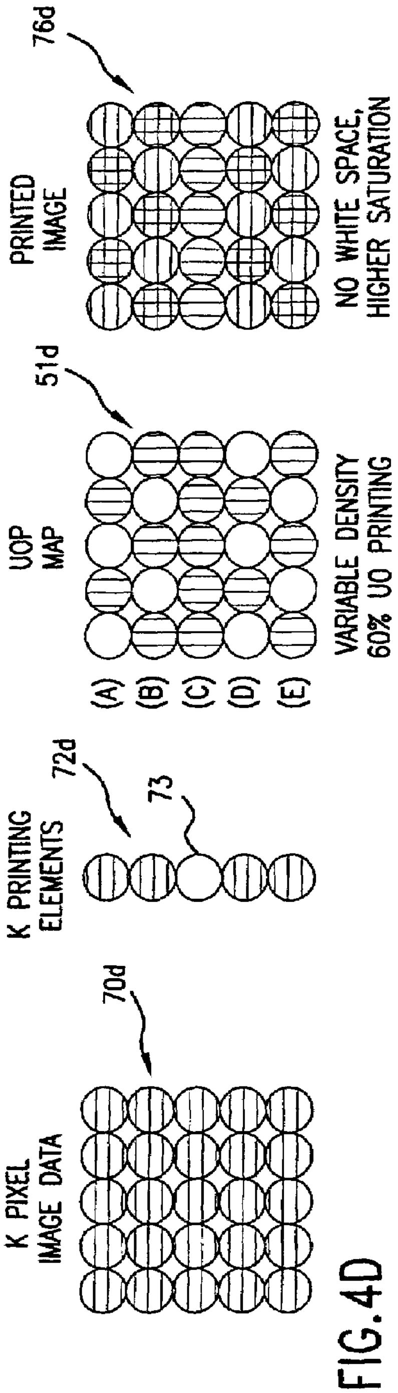
FIG. 4D is a schematic representation illustrating the printed image resulting from under/overprinting an exemplary black region using an exemplary adaptive variable density 60% under/overprinting map applied to an exemplary set of printing elements, one of which is defective, in which the dynamically-generated mask is constructed to compensate for the defective printing element.

An alternate embodiment of the printing system 10, as best understood with reference to FIG. 3, includes a multifunction device 6'. The multifunction device 6' typically includes the capability to optically scan an item such as a text document, a graphic or a photograph placed on a platen 38, and print the scanned image. Some multifunction devices 6' also include the capability to receive and print faxes or e-mail. A keyboard 32 and a display 34 for user interaction are typically included as part of the multifunction device 6'.

Considering further the types and colors of inks preferably included in a printing system 10 usable with the present invention, each printhead 25 preferably deposits drops of a different colored ink or fluid. The preferred printing system 10 includes a printhead 25 for black ink, and printheads 25 for each of the subtractive primary colors magenta, cyan, and yellow. Other color shades are formed by depositing drops of these four colors on the same or nearby pixel locations. The black ink is preferably pigment-based, while the magenta, cyan, and yellow inks are preferably dye-based. The black ink typically produces a “true” or process black that is richer than can be achieved by mixing the subtractive primary colors. Drops of the black ink may also be used to producing some of the darker shades of other colors. In one alternate printing system 10 that includes two additional printheads, there are light and dark shades of both magenta and cyan inks, while another alternate printing system 10 commonly referred to as a “hexachrome” system additionally includes orange and purple inks. A printhead 25 for a substantially clear conditioning solution may alternatively or additionally included in some embodiments.

The term “under/overprinting”, as used herein, refers generically to the deposition of drops of ink or fluid from an additional printhead 25*a* underneath and/or on top of drops of ink from the color printhead 25*k* so as to produce uniform color with minimal or no unprinted “white space” on the medium in a region to be printed in the desired color. The term “underprinting” describes printing the drops of ink or fluid from the additional printhead 25*a* underneath the drops of ink from the color printhead 25*k*, while the term "overprinting" describes printing the drops of ink or fluid from the additional printhead 25*a* on top of the drops of ink from the color printhead 25*k*.

With regard to ink allocation for under/overprinting purposes in the preferred embodiment of the present invention, the color printhead 25*k* preferably prints the black ink, while the additional printheads 25*a* of the present invention under/overprint either magenta and cyan inks, or the conditioning solution. Yellow ink may be, but typically is not, used for under/overprinting purposes. In an alternate embodiment where a substantially clear conditioning solution is under/overprinted by the additional printhead 25*a*, the color printhead 25*k* may deposit ink of any color.

With regard to the regions of uniform color that are printed according to the present invention, these regions are groups of rows and columns of pixel data that are printed on the print medium as corresponding groups of rows and columns of printed pixel locations. These regions can be of arbitrary size and shape. A typical example of such regions, such as region 47, is the interior portions of textual characters printed in black ink. The textual characters often are printed in larger fonts that result in relatively large areas of uniform black color within each character.

With regard to the image data that is received by the print controller, the image data file in the computer 30 is typically in an RGB format that is well known to those skilled in the art. The computer 30 preferably processes the image data file so as to divide it into swaths of data. Each swath of image data transmitted to the printer 6 is converted from RGB into a format which matches the color of the inks in the printer 6; in the preferred embodiment this is KCMY (ie. black, cyan, magenta, and yellow) format. Each image data pixel in KCMY format contains four intensity values. Each of these four intensity values represents how much of the corresponding color ink is to be deposited onto the pixel location on the medium for that image data pixel during printing; the print controller 58 generates the proper control commands to deposit those drops in the appropriate locations. A special-case intensity value for the cyan, magenta, and in some embodiments the yellow ink indicates those data pixels which are part of a region of uniform black color and for which under/overprinting according to the present invention is to be performed. Upon detecting the special-case intensity value, the print controller 58 magenta, and perhaps yellow ink as governed by the under/overprinting map for the corresponding printhead, as will be discussed subsequently. For data pixels that do not contain the special-case intensity value, the print controller 58 deposits the amount of each ink which indicated by the corresponding intensity value for that ink.

Considering now, with reference to FIGS. 4A, 4B, 4C, and 4D, the operation of under/overprinting at the individual pixel level, the impact of defective nozzles on print quality in regions of uniform color can be understood, and the benefits of adaptive, variable density under/overprinting appreciated. For illustrative purposes, assume an exemplary 5×5 image data pixel region 70*a,b,c,d* representing a region to be printed in a uniform black color. Each row of pixels in region 70*a,b,c,d* will be printed using the corresponding one of the printing element sets 72*a,b,c,d*. In addition, to ensure that the region will be uniformly printed in a high density black color, the pixel locations on the print medium will also be under/overprinted by at least one additional color according to the corresponding UOP map 51*a,b,c,d*. The circles in UOP map 51*a,b,c,d* that are filled in with vertical bars represent pixel positions that will be under/overprinted, while the empty circles represent pixel positions that will not be printed. The UOP maps define a certain percentage of under/overprinted pixels. For example, it is readily seen that the exemplary UOP maps 51*a,b,c* under/overprint 13 of the 25 pixel positions in the mask, or 52% of the pixel positions, while exemplary UOP map 51*d* under/overprints 15 of the 25 pixel positions in the mask, or 60% of the pixel positions. The resulting printed patterns 76*a,b,c,d* illustrate the printed output resulting from printing the corresponding data pattern 70*a,b,c,d* using the corresponding printing elements 72*a,b,c,d* and the corresponding UOP map 51*a,b,c,d*. In printed patterns 76*a,b,c,d*, circles that are filled in with horizontal bars indicate pixel positions that will be printed with black ink; circles that are filled in with vertical bars indicate pixel positions that will be printed with the additional color ink with which the UOP map is associated; circles that are filled in with both vertical and horizontal bars indicate pixel positions that will be printed with both black ink and the additional color ink with which the UOP map is associated; and empty circles represent pixel positions in which no ink will be printed.

Where all the printing elements 72*a* are functional, and the data pattern 70*a* is printed using a uniform density 52% under/overprinting map 51*a*, the printed output 76*a* contains the desired percentage of under/overprinted pixels, and contains no unprinted pixels. Because the ink drops typically spread out and overlap each other on the print medium, this produces a visually appealing uniform black pattern with virtually no perceptible white space in the region of data pattern 70*a*. The term "uniform density" refers to a substantially random placement of the under/overprinted pixel positions within the UOP map 51*a*. With such a placement, each row of pixel locations has substantially the same percentage of under/overprinted pixel positions relative to the total pixel positions. It can be seen, for example, that in map 51*a* each pixel row under/overprints either two or three of the five pixel positions (a plus or minus one difference is necessary to achieve the desired percent density).

Where one of the printing elements 72*b* is a defective printing element 73, and the data pixel region 70*b* is printed using a 52% under/overprinting map with a uniform density pixel arrangement 51*b*, the printed output 76*b* has visible white space due to the row of pixel positions printed with the defective black printing element 73. This results in "holes" or unprinted areas that are visually perceptible by a user and considered to be of unacceptable print quality.

Where one of the printing elements 72*c* is a defective printing element 73, and the data pixel region 70*c* is printed using a 52% UOP map with a variable density pixel arrangement 51*c* that compensates for defective printing elements, the printed output 76*c* has no unprinted pixels due to the row of under/overprinted pixel positions corresponding to the defective element 73. By under/overprinting all pixel positions which correspond to the defective printing element 73, the UOP map 51*c* ensures that all pixel positions in the printed output 76*c* receive at least some ink. The term "variable density" refers to a placement of the under/overprinted pixel positions within the UOP map 51*c* that under/overprints every pixel location adversely affected by the defective element 73. With such a placement, each row of pixel locations corresponding to the defective element 73 has a higher percentage of under/overprinted pixel positions than do those rows which correspond to functional printing elements. It can be seen, for example, that in UOP map 51*c* pixel row C under/overprints every pixel position. The UOP map 51*c* maintains the same total percentage of under/ overprinting within the map 51*c* by overprinting a lower percentage of pixels in rows printed by functional black printing elements compared to the uniform density map 51*b*.

Where one of the printing elements 72*d* is a defective printing element 73, and the data pixel region 70*d* is printed using 60% UOP map with a variable density pixel arrangement 51*c* that compensates for defective printing elements, the printed output 76*d* has no unprinted pixels due to the row of under/overprinted pixel positions corresponding to the defective element 73. This is achieved by under/overprinting every pixel position in rows which correspond to defective printing elements such as element 73. The UOP map 51*d* increases the total percentage of under/overprinting compared to the map 51*c* from 52% to 60% by overprinting the same percentage of pixels in rows printed by functional black printing elements as the uniform density map 51*b*.

The UOP maps 51 for each additional printhead 25*a* that performs under/overprinting may have a different under/overprinting pattern, including a different total percentage of under/overprinted pixels, as well as different locations for the under/overprinted pixels. An additional printhead 25*a* may have more than one map 51; for example, one map 51 may be used when the printhead 25*a* deposits drops of its ink or fluid on the medium before the color printhead 25*k* deposits drops of black ink (eg. underprinting); and a different map 51 may be used when the printhead 25*a* deposits drops of its ink or fluid on the medium on top of the drops of black ink deposited by the color printhead 25*k* (eg. overprinting). Furthermore, the maps may be different for different additional printheads 25*a*; for example, where magenta and cyan inks are used for under/overprinting black regions, judicious selection of the amounts and locations of under/overprinted magenta and cyan pixels will provide a uniform black appearance.

Figure 5A:
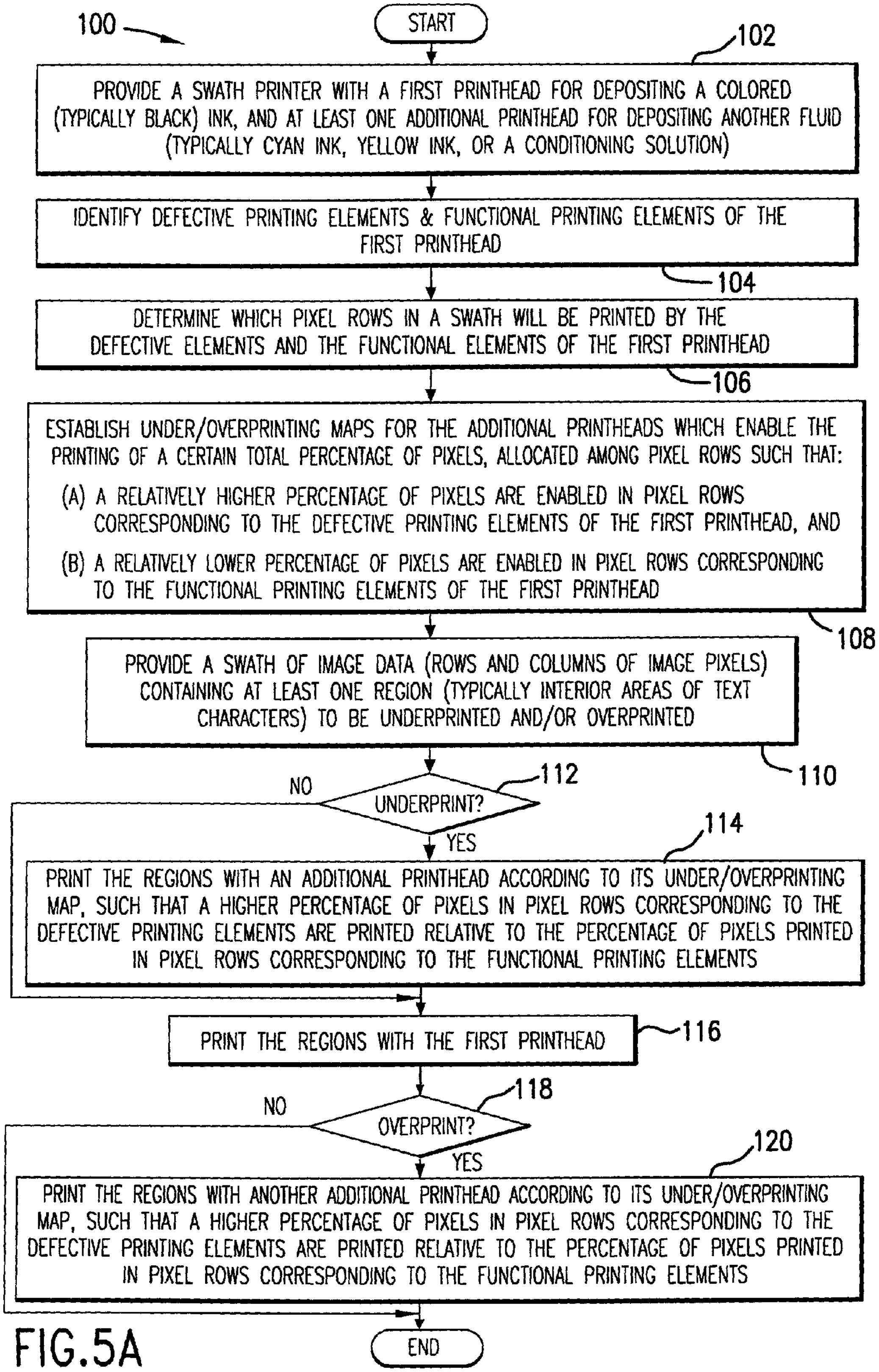
FIG. 5A is a top-level flowchart of a novel under/overprinting method usable with the swath printing system of FIG. 1.

Considering now a novel under/overprinting method 100 usable with the printing system 10, and with reference to FIG. 5A, the method 100 starts at 102 by providing a swath printer with a first printhead 25*k* for depositing a colored ink (preferentially black ink), and at least one additional printhead 25*a* for depositing another fluid (typically three additional printheads 25*a*, one each for cyan, magenta, and yellow ink; and/or one additional printhead 25*a* for a conditioning solution). At 104, defective ones and functional ones of the printing elements 24 of the first printhead 25*k* are identified. At 106, the method determines which pixel rows 41 in a swath will be printed by the defective elements of the first printhead 25*k*, and which pixel rows 41 will be printed by the functional elements of the first printhead 25*k*. At 108, and as will be discussed subsequently in further detail, at least one under/overprinting map 51 for each additional printhead 25*a* is established. These UOP maps 51 enable the printing of a certain total percentage of pixels. The positions of the under/overprinted pixels in a UOP map 51 are allocated among to different rows of the UOP map 51 such that (a) a relatively higher percentage of pixels are enabled in rows corresponding to the defective printing elements of the first printhead 25*k*, and (b) a relatively lower percentage of pixels are enabled in rows corresponding to the functional printing elements of the first printhead 25*k*. At 110, a swath of image data, organized as rows and columns of image pixels, and containing at least one region to be underprinted and/or overprinted is provided to the printing system 10. Typically these regions correspond to the interior portions of text characters. If underprinting is to occur ("Yes" branch of 112), then at 114 the regions are printed with an additional printhead 25*a* according to the appropriate UOP map 51 used by that printhead 25*a* for underprinting. The map 51 provides that a higher percentage of pixels in pixel rows 41 corresponding to the defective ones of the printing elements 24 are printed, compared to the percentage of pixels printed in pixel rows 41 corresponding to the functional ones of the printing elements 24. How the UOP map 51 (which typically has many fewer rows and columns than the swath) prints all the regions in the image swath will be discussed subsequently. After the underprinting of 114 has been performed, or if no underprinting is to be performed ("No" branch of 112), then at 116, the regions are printed with the first printhead 25*k*. If overprinting is to occur ("Yes" branch of 118), then at 120 the regions are printed with an additional printhead 25*a* according to the appropriate UOP map 51 used by that printhead 25*a* for overprinting. When the overprinting is completed, the method concludes.

Figure 6:
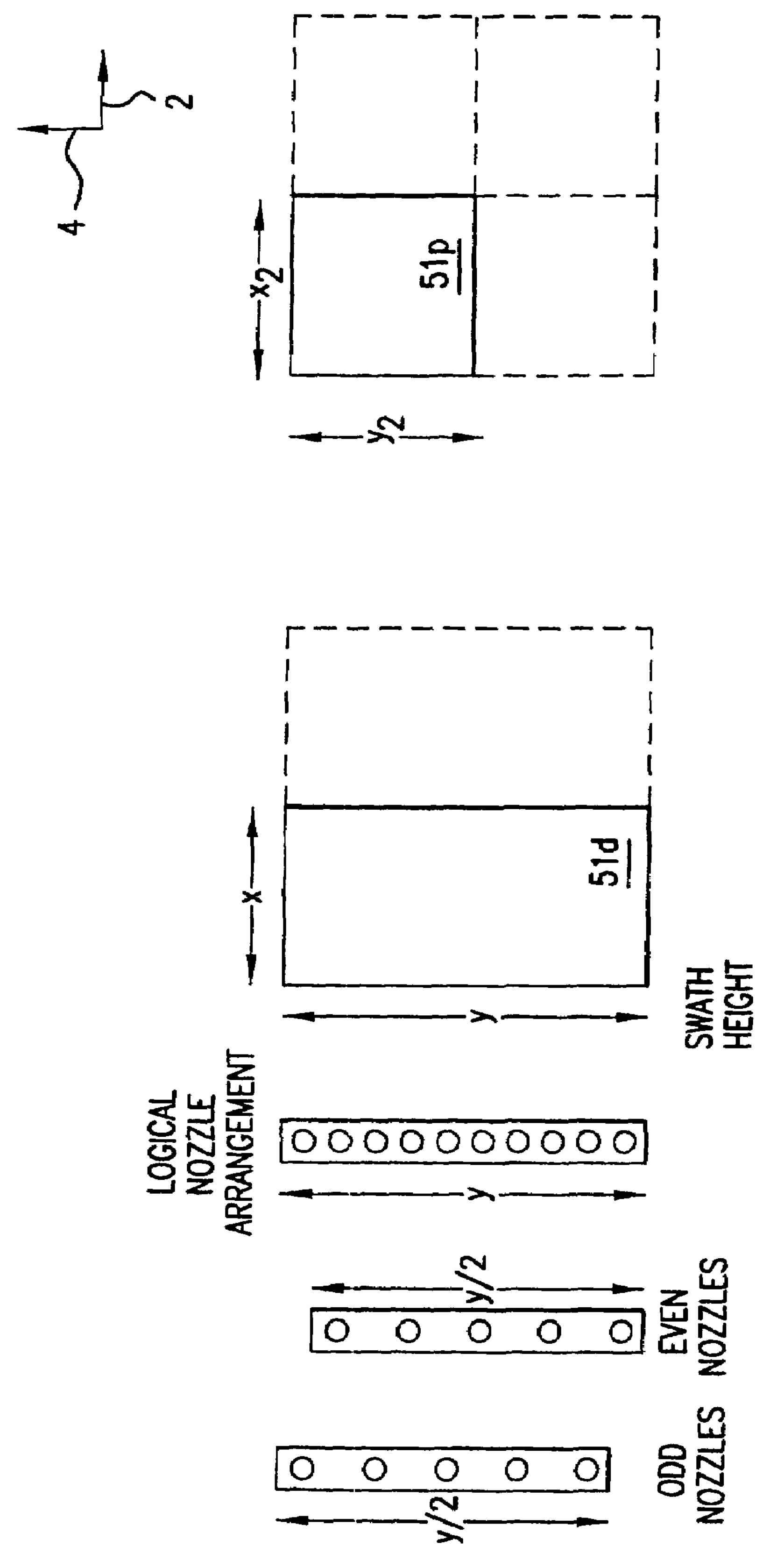
FIG. 6 is a schematic representation showing the dimensioning and replication of a dynamically-generated under/overprinting map and a selected under/overprinting map according to the present invention.

Before discussing in further detail the establishing 108 of a UOP map 51, and as best understood with reference to FIG. 6, a UOP map 51 may either be (a) chosen from a predetermined set of maps, or (b) dynamically generated. Printing system resource tradeoffs typically determine which type of UOP map 51 a printing system 10 will choose to utilize. If a printing system 10 contains a relatively large amount of memory (so as to store a large UOP map), and has a processor with relatively large amount of computational power (so as to generate a UOP map in an appropriate amount of time), the system 10 will preferably generate dynamically a swath-high UOP map 51*d* customized for the particular arrangement of functional and defective printing elements 24 in each color printhead 25*k*. Dynamically generating a swath-high UOP map 51*d* easily corrects for multiple defective printing elements by allowing a custom UOP pattern to be specified which addresses all the defective printing elements 24 of the printhead 25*k* wherever they are located. Such a UOP map 51*d* typically is an x-by-y matrix, where y is equal to the number of logical printing elements 24 of a printhead 25*k*, and x is typically between 5 and 8. Given sufficient memory, x could be expanded up to the number of pixels in a row 41. During printing, the UOP map 51*d* is replicated along the scan axis 2 as required to print the swath.

Conversely, if a printing system 10 contains a relatively small amount of memory or has a processor with a relatively small amount of computational power, the system 10 will preferably select and replicate one of a predefined set of smaller (e.g. less than swath-high) UOP maps, in order to reduce the computational and memory resources required for depletion. Each such UOP map 51*p* typically is an x2-by-y2 matrix, where x2 and y2 are typically between 5 and 8. A sufficient number of UOP maps, such as UOP map 51*p*, are provided in the set so as to allow a selection that will compensate for a defective printing element 24 on at least any single one of the y2 rows. During printing, the selected UOP map 51*p* is replicated along the scan axis 2 and the medium advance axis 4 as required to print the swath. If there is more than one defective printing element 24 in a printhead 25*k*, the defective printing elements 24 may not all align with the same row of the mask 51*p* when it is replicated; in such a situation, it may only be possible to correct for some of the defective elements 24, not all of them.

Figure 5B:
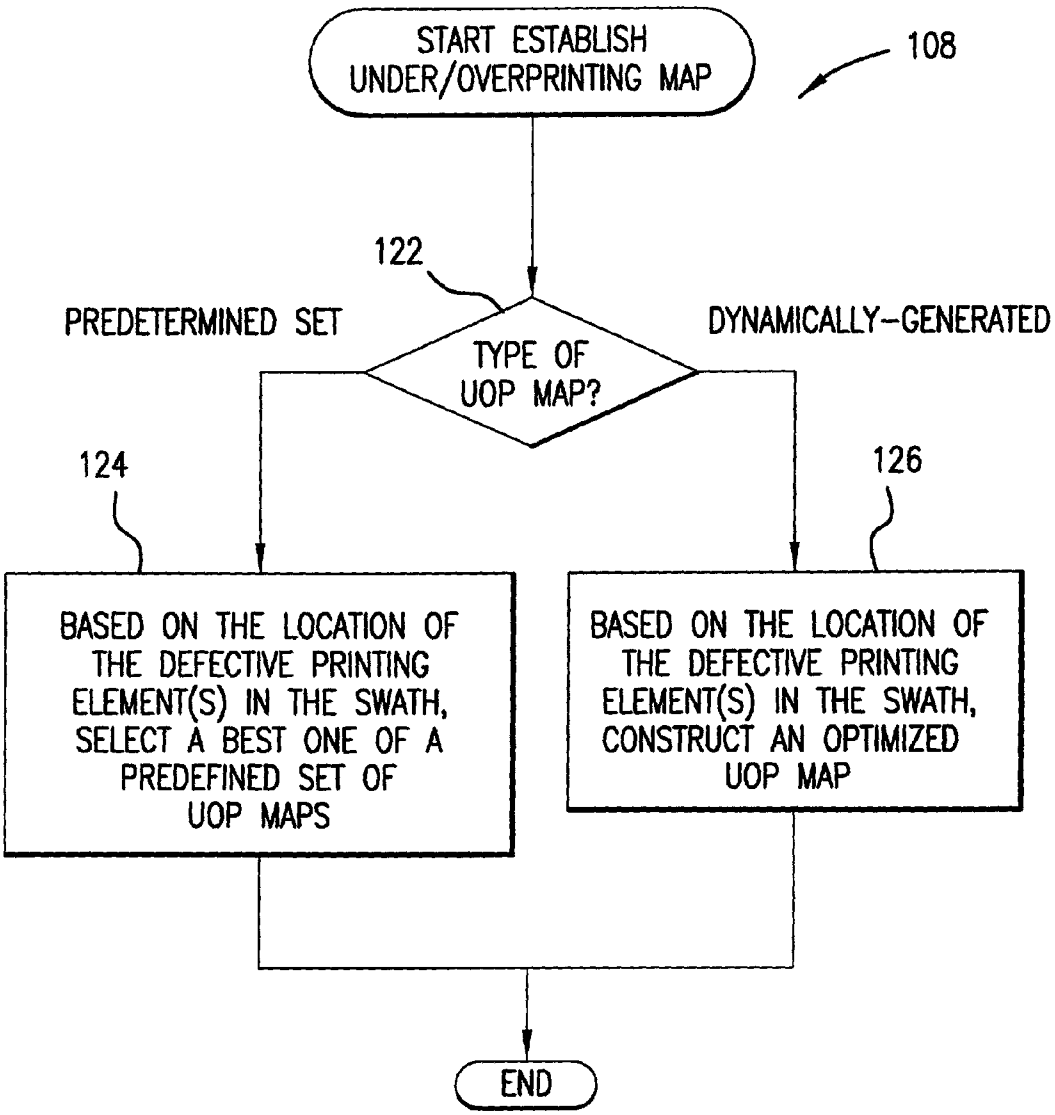
FIGS. 5B–5C are lower-level flowcharts of different portions of the method of FIG. 5A.

Considering now in further detail the establishing 108 of a UOP map 51, and with reference to FIG. 5B, at 122 the type of UOP map 51 to be used is determined. If the printing system 10 provides a predefined set of UOP maps ("Predetermined Set" branch of 122), then at 124 the best one of the predefined set of UOP maps 51*p* is selected, as explained above, based on the location of the defective printing element (or elements) 24. If the printing system 10 dynamically generates the UOP map 51*d* ("Dynamically-generated" branch of 122), then at 126 the UOP map 51*d* is constructed, based on the location of the defective printing element or elements in the swath, to optimize under/overprinting so as to produce a uniform, high density color in the regions. The establishing 108 may be performed iteratively to establish different UOP maps 51, as discussed previously, for use in either underprinting or overprinting, and with each separate additional printhead 25*a*.

Figure 5C:
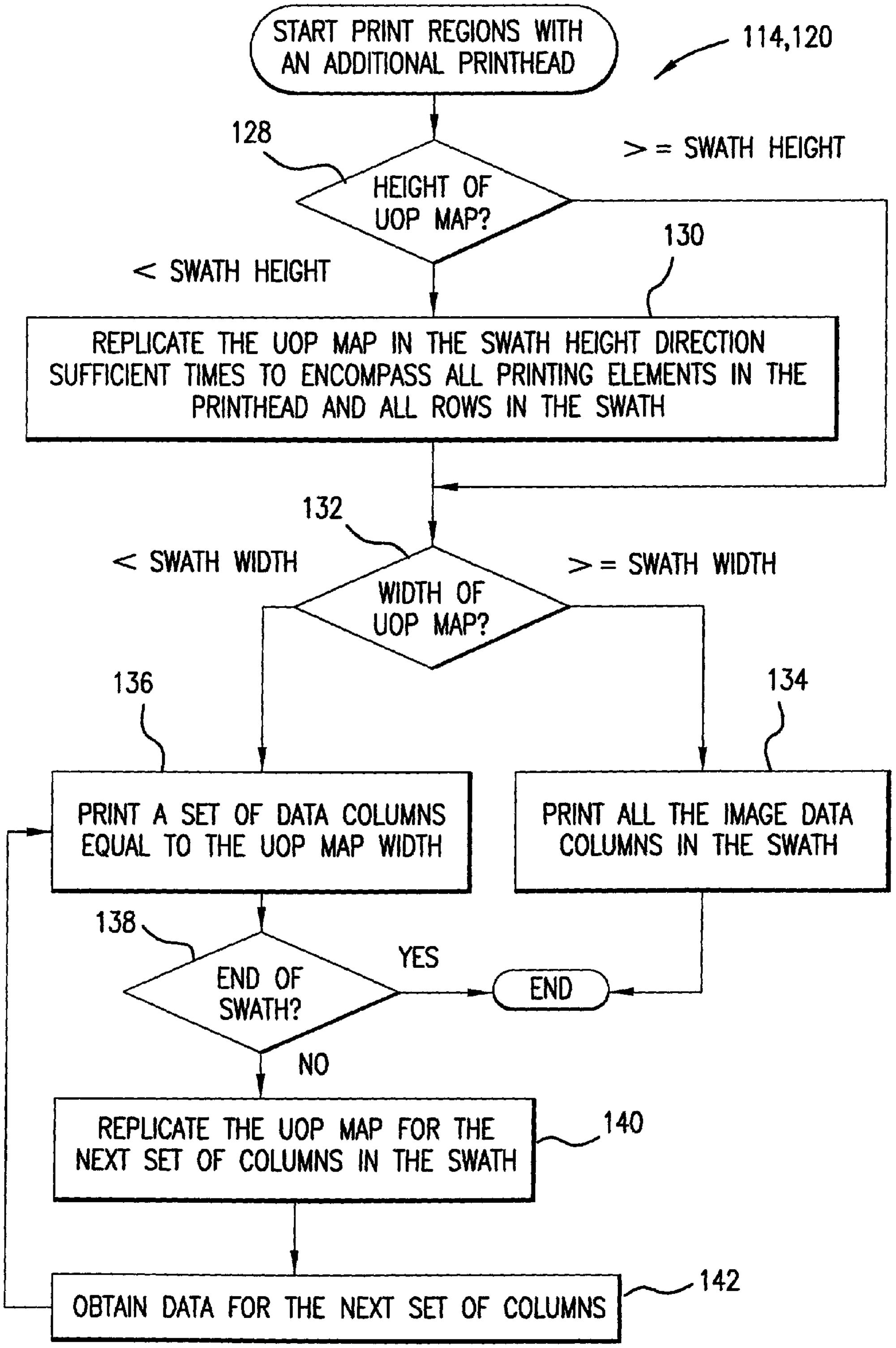

Considering now in further detail the printing 114,120 of the uniform color regions with one of the additional printheads 25*a*, and with reference to FIG. 5C, at 128 the height of the UOP map 51 is ascertained. The height of each swath typically corresponds to the number of pixel rows that can be printed by the printing system 10 at a time, which in turn typically corresponds to the number of printing elements 24 in a printhead 25. If the height of the UOP map 51 is less than the swath height ("<Swath Width" branch of 128), then at 130 the UOP map 51 is replicated in the swath height direction sufficient times to encompass all printing elements in the printhead, and thus all rows in the swath. When the replication is concluded, or if the height of the UOP map 51 is at least equal to the swath height (">=Swath Width" branch of 128), then at 132 the width of the UOP map 51 is ascertained. If the width of the map 51 is at least equal to the swath width (">=Swath Width" branch of 132), then at 134 all the columns in the swath are printed, and the printing concludes. If the width of the map 51 is less than the width of the swath ("<Swath Width" branch of 132), then at 136 a set of columns of swath image data equal to the UOP map 51 width is printed. If printing of the swath was completed because the end of the swath was reached during the printing of 136 ("Yes" branch of 138), the printing concludes. If more of the swath remains to be printed ("No" branch of 138), then at 140 the UOP map 51 is replicated for the next set of columns in the image data swath, the image data for the next set of columns in the image data is obtained at 142, and the printing continues at 136.

It should be noted that the above-described schematic representations of FIGS. 1A, 4A–4D, 6, and/or the flowcharts of FIGS. 5A–5C show the architecture, functionality, and operation of the present invention. If embodied in software, each block may represent a module, segment, or portion of code that comprises one or more executable instructions to implement the specified logical function(s) described heretofore. If embodied in hardware, each block may represent a circuit or a number of interconnected circuits to implement the specified logical function(s). Although these diagrams and/or flowcharts may show a specific order of execution, it is understood that the order of execution may differ from that which is depicted. For example, the order of execution of two or more blocks may be scrambled relative to the order shown. Also, two or more blocks shown in succession may be executed concurrently or with partial concurrence. It is understood that all such variations are within the scope of the present invention. Also, the schematic representations of FIGS. 1A 4A–4D, 6, and/or the flowcharts of FIGS. 5A–5C are relatively self-explanatory and are understood by those with ordinary skill in the art to the extent that software and/or hardware can be created by one with ordinary skill in the art to carry out the various logical functions as described herein.

From the foregoing it will be appreciated that the swath printing system and under/overprinting method provided by the present invention represent a significant advance in the art. Although several specific embodiments of the invention have been described and illustrated, the invention is not limited to the specific methods, forms, or arrangements of parts so described and illustrated. In particular, while the preferred embodiment has one printhead per print cartridge, alternate embodiments can have multiple printheads in each print cartridge. Additionally, the supply of ink may be included within the print cartridge, or may be located elsewhere and supplied to the print cartridge via a fluidic coupling mechanism such as a tube or the like. Furthermore, while the image data is preferably provided in RGB format, in alternate embodiments it may be provided in a KCMY format or a black-only format. The invention is limited only by the claims.

What is claimed is:

1. A method for uniformly printing pixel rows of a predetermined region of an image swath in a color, comprising:

providing a first printhead having a first ink matched to the color and at least one additional printhead having a fluid, each printhead having individual printing elements for controllably printing individual pixels in corresponding ones of the rows;

detecting defective printing elements and functional printing elements in the first printhead;

identifying the rows corresponding to the defective printing elements and the functional printing elements; and printing individual pixels using an under/overprinting map defining a predetermined total percentage of under/overprinted pixels, the map enabling at least one of the additional printheads such that a higher percentage of pixels in the rows corresponding to the defective elements are print relative to the percentage of pixels printed in the rows corresponding to the functional elements.

2. The method of claim 1, wherein the fluid is a colored ink.

3. The method of claim 2, wherein each at least one additional printhead has a different colored ink.

4. The method of claim 2, wherein the first ink is black ink, and the colored ink is selected from the group consisting of cyan ink, magenta ink, and yellow ink.

5. The method of claim 1, wherein the fluid is a conditioning solution.

6. The method of claim 5, wherein the conditioning solution has a substantially clear color.

7. The method of claim 1, further including:

printing at least some individual pixels with the first printhead.

8. The method of claim 7, wherein some individual pixels are printed with the at least one of the additional printheads before the some individual pixels are printed with the first printhead such that the fluid is placed on the image swath below the first ink.

9. The method of claim 8, wherein some individual pixels are printed with a different at least one of the additional printheads after the some individual pixels are printed with the first printhead such that the fluid is placed on the image swath on top of the first ink.

10. The method of claim 7, further comprising:

providing image data; and processing the image data to form the image swath.

11. A method for printing a predetermined region of an image swath organized in rows and columns of pixels in a color, comprising:

identifying defective printing elements in a first printhead;

providing at least one under/overprinting map defining a predetermined total percentage of under/overprinted pixels, the map enabling the printing of relatively more pixels in at least some rows corresponding to the defective printing elements and relatively fewer pixels in at least some other rows corresponding to other printing elements; and printing the predetermined region with at least one additional printhead according to the corresponding one of the under/overprinting maps, Wherein the predetermined region includes a region of uniform black color.

12. The method of claim 11, wherein the predetermined total percentage is the same regardless of the number of defective printing elements in the first printhead.

13. The method of claim 11, wherein the predetermined total percentage is proportional to the number of defective printing elements in the first printhead.

14. The method of claim 11, wherein the predetermined region represents at least a portion of at least one text character.

15. The method of claim 11, further including:

printing the predetermined region with the first printhead.

16. The method of claim 15, wherein the first printhead deposits drops of an ink having the color, and each additional printhead deposits drops of another fluid.

17. The method of claim 16, wherein the ink is a pigment-based ink.

18. The method of claim 16, wherein the fluid is a dye-based ink having a different color.

19. The method of claim 18, wherein:

the color is black;

the at least one additional printhead is a second printhead and a third printhead;

the second printhead deposits drops of cyan ink; and the third printhead deposits drops of magenta ink.

20. The method of claim 11, wherein the predefined total percentage of under/overprinted pixels is different for at least some of the overprinting maps.

21. The method of claim 11, wherein the providing further comprises, for each of the at least one under/overprinting maps:

constructing the at least one under/overprinting map based on the defective printing elements.

22. The method of claim 11, wherein the providing further comprises, for each of the at least one under/overprinting maps:

selecting one of a predefined set of under/overprinting maps based on the defective printing elements.

23. The method of claim 11, wherein the corresponding under/overprinting map has a width less than or equal to the number of columns in the swath and a height less than or equal to the number of rows in the swath, and wherein the printing further comprises replicating the under/overprinting map in the column direction and the row direction so as to encompass the total number of rows and columns in the swath.

24. A swath printer, comprising:

means for identifying defective printing elements in a first printhead of the swath printer;

means for mapping at least one of the defective printing elements to at least one corresponding defectively-printed pixel row in a uniformly black colored region of an image swath; and means for under/overprinting with another printhead more pixel positions in at least one defectively-printed pixel row than in at least some other pixel rows so as to compensate for the defective printing element corresponding to the defectively-printed pixel row.

25. A swath printing system, comprising:

a print mechanism responsive to control commands for printing drops of a black pigmented ink and at least one additional fluid from a plurality of printing elements onto specific pixel locations of pixel rows of a print medium to print an image;

at least one under/overprinting map for governing the printing of the drops of a corresponding at least one additional fluid, the map defining a relatively higher percentage of printable pixel locations in the pixel rows corresponding to defective ones of the printing elements and a relatively lower percentage of printable pixel locations in the pixel rows corresponding to functional ones of the printing elements; and a print controller connected to the under/overprinting map and the print mechanism, the print controller adapted to receive image data for the region of uniform black color and generate control commands for printing drops of the at least one additional fluid as governed by the under/overprinting map.

26. The swath printing system of claim 25, further comprising:

a printing element quality detector connected to the print mechanism and the print controller for identifying the defective ones of the printing elements and the functional ones of the printing elements.

27. The swath printing system of claim 25, wherein the print controller further generates control commands for printing drops of the colored ink.

* * * * *